Oct. 17, 1950 W. J. O'BRIEN 2,526,266

TUNING MEANS FOR RADIO RECEIVERS

Original Filed April 10, 1941 4 Sheets-Sheet 1

Inventor:
William J. O'Brien
By Hinkle, Horton, Ahlberg Hausmann & Wupper
Attorneys.

Oct. 17, 1950 W. J. O'BRIEN 2,526,266
TUNING MEANS FOR RADIO RECEIVERS
Original Filed April 10, 1941 4 Sheets-Sheet 2
Fig. 1.A.
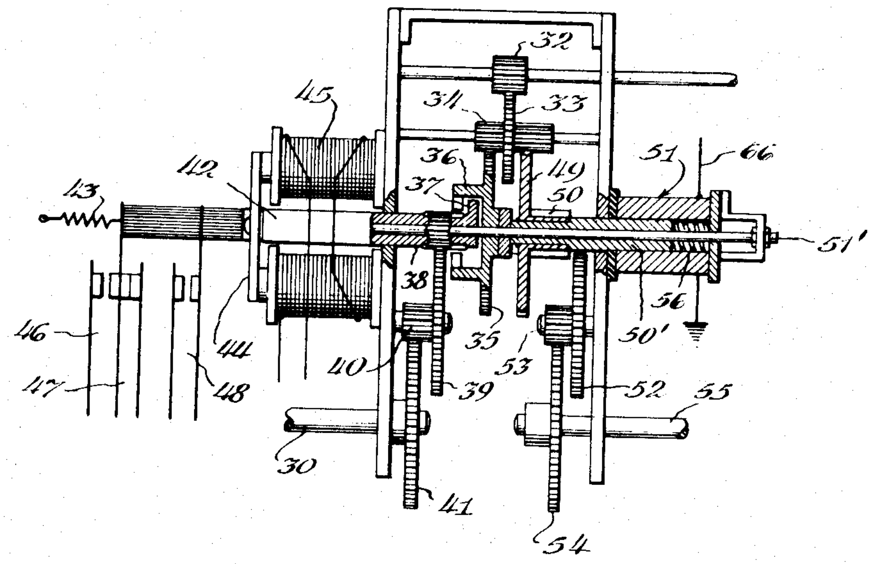
Fig. 4.A.
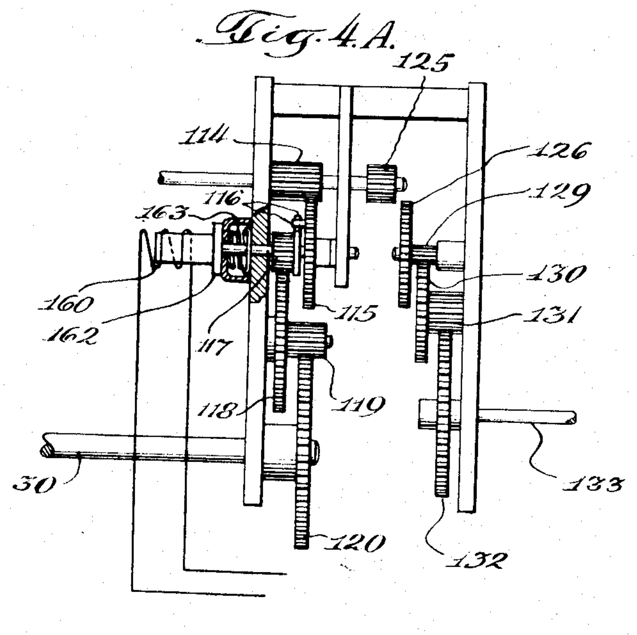
Inventor:
William J. O'Brien
By Hinkle, Horton, Ahlberg, Hausmann & Wupper
Attorneys.

Oct. 17, 1950 W. J. O'BRIEN 2,526,266

TUNING MEANS FOR RADIO RECEIVERS

Original Filed April 10, 1941 4 Sheets-Sheet 3

Inventor:
William J. O'Brien
By Hinkle, Horton, Ahlberg, Hausmann & Hupper
Attorneys.

TUNING MEANS FOR RADIO RECEIVERS

Original Filed April 10, 1941 4 Sheets-Sheet 4

Inventor:
William J. O'Brien
By Hinkle, Horton, Apleberg, Hausmann & Hopper
Attorneys.

Patented Oct. 17, 1950 2,526,266

UNITED STATES PATENT OFFICE 2,526,266

TUNING MEANS FOR RADIO RECEIVERS

William J. O'Brien, London, England, assignor, by mesne assignments, to Signal Tuned Radio Corporation, Chicago, Ill., a corporation of Illinois Original application April 10, 1941, Serial No. 387,907, now Patent No. 2,426,580, dated August 26, 1947. Divided and this application July 3, 1946, Serial No. 681,183

20 Claims. (Cl. 250—20)

This invention relates to the tuning of radio apparatus and particularly to radio receivers embodying tuning devices of the stop-on-carrier, stop-on-signal or signal-tuned, such as those described and claimed in the Edward F. Andrews Patents No. 2,262,218, granted November 11, 1941, and No. 2,326,737, granted August 17, 1943. This application is a division of my copending application Serial No. 387,907, filed April 10, 1941, entitled "Radio Receivers," which issued as Patent No. 2,426,580, on August 26, 1947.

This invention relates to means for improving the rapidity of action, the accuracy of tuning, and discrimination in favor of the desired signal in radio receivers having stop-on-carrier tuning and for otherwise improving such devices.

The invention further relates to the drive mechanism for regulating the volume and effecting stop-on-carrier tuning in automobile sets or home sets either from a remote point or otherwise.

One of the objects of this invention is to provide a new and improved radio receiver of the stop-on-carrier type.

Another object of the present invention is to provide an economical and simple arrangement for driving the gain control by the tuning means driving motor and controllable by switching means from any convenient point.

A further object of the present invention is to provide improvements in the sensitivity control of stop-on-carrier tuning devices.

A further object of the present invention is to provide a new and improved stop-on-carrier control wherein two control voltages, one of which may be called an actuating voltage and the other a restraining voltage, are applied to different elements of an electron tube means.

Another object of the present invention is to provide a new and improved stop-on-carrier control wherein one of the aforesaid two control voltages, notably the actuating voltage, is obtained from the automatic gain control voltage of the radio receiver.

Another object of the present invention is the provision of a new and improved stop-on-carrier control wherein a "fast acting" automatic gain control voltage is utilized for the purpose of providing the actuating voltage, thereby to provide an actuating voltage with a minimum of delay as a signal is tuned in.

A further object of the present invention is to provide new and improved circuit arrangements including rectifying means for supplying a selective resultant control voltage for stop-on-carrier purposes.

A further and more specific object of the present invention is to provide a new and improved radio circuit arrangement for controlling a device in the plate circuit of an electron tube having a grid in response to a signal voltage of a predetermined frequency, which arrangement comprises means for obtaining from the radio a control voltage that is a maximum at said frequency, means for obtaining from the radio an opposing control voltage that is a maximum at a frequency slightly displaced from said frequency and a minimum at said frequency, and means including rectifying means for impressing a voltage that is a resultant of said two control voltages upon the grid of said tube to operate said device when the opposing voltage is lower than the other control voltage.

Other objects and advantages of the present invention will become apparent from the ensuing description, in the course of which reference is had to the accompanying drawings, in which:

Fig. 1 diagrammatically illustrates one embodiment of the invention;

Fig. 1–A is a fragmentary enlarged view of a portion of the apparatus shown in Fig. 1;

Figures 2, 3, 5, 6:
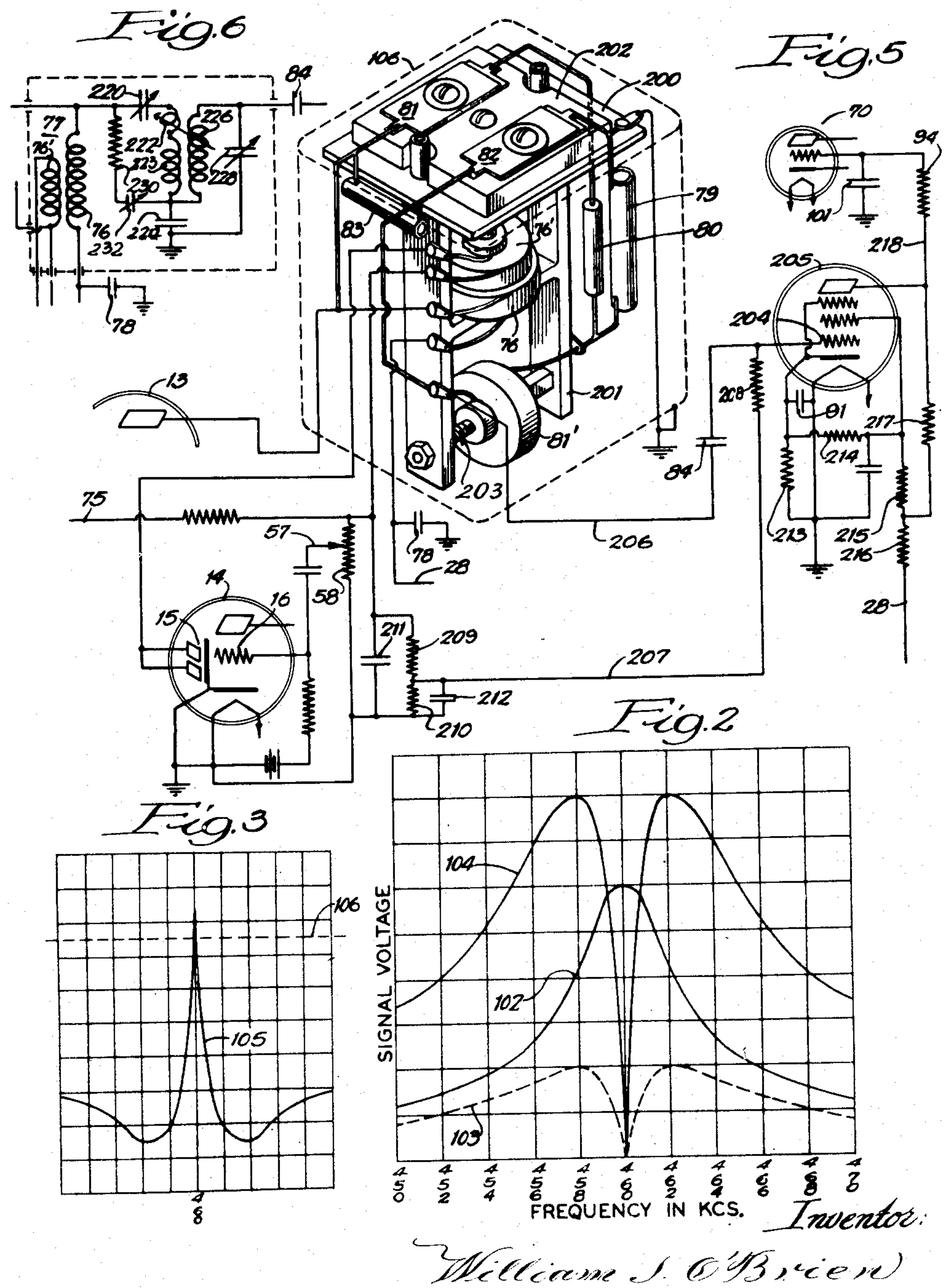
Fig. 2 is a graphic representation of certain control voltages obtaining in the embodiment of Fig. 1, and in other embodiments.
Fig. 3 is a graphic representation of the resultant of two of the control voltages illustrated in Fig. 2.
Figure 4:
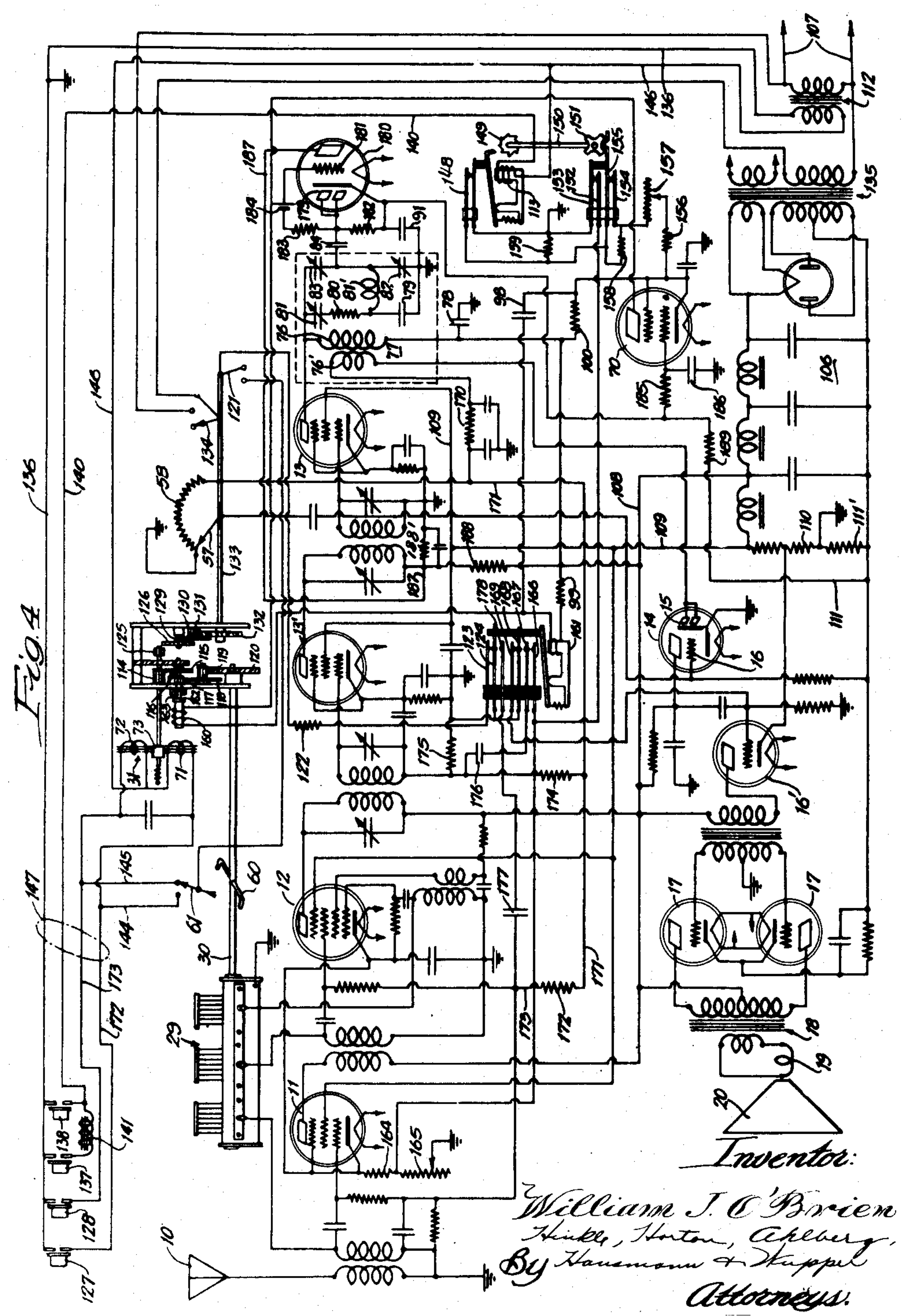
Fig. 4 is a diagrammatic representation of another embodiment of the invention.

Fig. 4–A is a fragmentary enlarged view of a portion of the apparatus shown in Fig. 4;

Fig. 5 is a partially diagrammatic and partially perspective view of another embodiment of the invention; and Fig. 6 is a partially diagrammatic view of a further embodiment of the invention.

Figure 1:
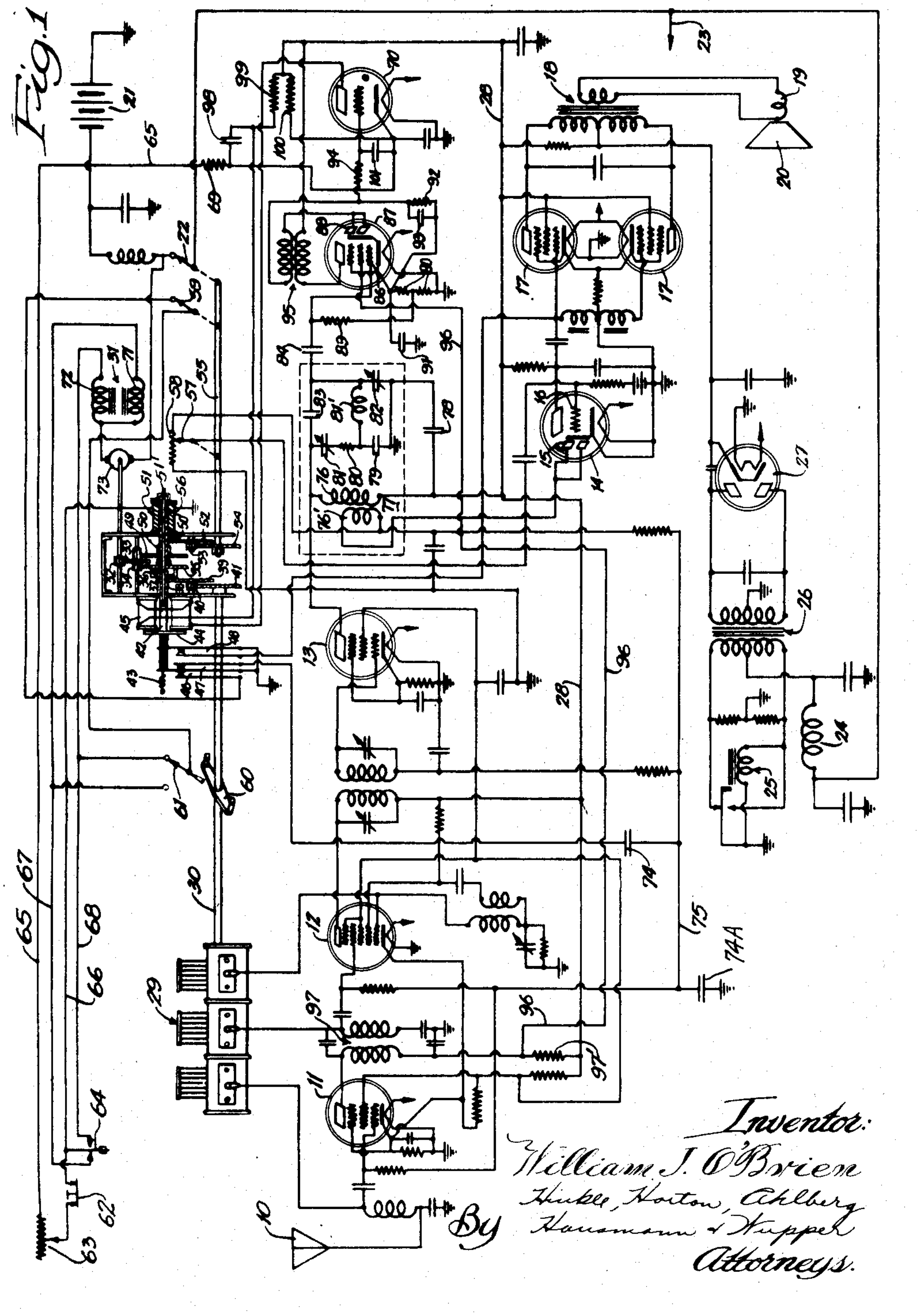

Referring to the drawings, Fig. 1 depicts a standard automobile superheterodyne receiver to which elements of my invention have been added. The receiver comprises an aerial 10, a radio frequency tube 11, a first detector and oscillator 12, an intermediate frequency tube 13, a tube 14 comprising a diode section 15 and an audio amplifier section 16 and two power amplifier tubes 17 connected in push-pull relation. The output of the power tubes 17 is connected through a transformer 18 to the voice coil 19 of a speaker 20.

Energy is supplied by a battery 21 adapted to be connected by a switch 22, illustrated in circuit closing position, to the cathode heater circuit 23, the speaker field coil 24, and to an interrupter 25. The interrupter 25 controls the flow of current through the primary of a transformer 26, the secondary of which is connected to a rectifier tube 27 which supplies B current to a B supply line 28.

The receiver is tuned by means of a gang of condensers 29 operable by a shaft 30. The gang of condensers is adapted to be driven by a reversible motor 31 through pinions 32, 33, 34, 35, clutch elements 36 and 37, and pinions 38, 39, 40, and 41, the latter being rigidly mounted on the shaft 30. The clutch element 37 and the pinion 38 are mounted on an axially movable and rotatable shaft 42 which is normally biased to the left, as viewed in Fig. 1, by a spring 43. The shaft 42 is movable to the right, as viewed in that figure, by an armature 44 (with respect to which it is rotatably mounted) upon energization of a fast acting relay 45 constructed and arranged in circuit relative to a gas type control tube in a manner specifically set forth and claimed in my copending application Serial No. 387,908, filed April 10, 1941 now Patent No. 2,442,430 granted June 1, 1948. The clutch elements 36 and 37 are in engagement when the relay 45 is deenergized, and are disengaged when the relay is energized—the elements being shown in disengagement better to illustrate the construction. The armature 44 controls the operation of switches 46, 47, and 48. Switches 46 and 48 are closed and switch 47 is open when the relay 45 is deenergized. When the relay 45 is energized, switch 47 is closed and switches 46 and 48 are open, as shown in Fig. 1.

The pinion 34 meshes with a gear 49, which is rigidly secured to the pinion 50, the gear 49 and pinion 50 being mounted on the rotatable armature 50' of a solenoid 51. The pinion 50 and armature 50' are rotatable about a shaft 51' supported by a suitable bracket and the inner end of shaft 42, which is made hollow so as to receive the shaft 51' and so as to be movable relative thereto by solenoid 45. When the solenoid 51 is energized, the pinion 50 meshes with a gear 52 which is connected through gears 53 and 54 to a shaft 55. When the solenoid 51 is deenergized, a spring 56 forces the gear and pinion 49 and 50 to the left, as viewed in Fig. 1, so that the pinion 50 is moved out of mesh with the gear 52. It will be understood that a clutch similar to the clutch 36 and 37 may be employed to connect the pinion 50 to the gear 52 instead of the meshing and unmeshing of the gears, if desired. The shaft 55 actuates the movable arm 57 of a volume control potentiometer 58 and also actuates the power switch 22 and a motor circuit controlling switch 59.

The shaft 30 carries an abutment member 60 which is adapted to throw a two-way limit switch 61 from one position to the other at the limits of movement of the condensers 29. As will hereinafter be readily understood, the throwing of the switch 61, which is connected to switch 59, reverses the direction of rotation of the motor 31 so that the condensers move back and forward from one extreme position to the other, and vice versa, until the motor is stopped when a carrier is received.

The receiver is adapted to be controlled from a remote position by means of a remote control unit which comprises the elements in the extreme left hand top corner of Fig. 1. The remote control unit comprises a normally closed switch 62, a sensitivity controlling rheostat 63, and a single pole, double throw power and volume control switch 64 which is resiliently biased to a normally open intermediate position, in which it is shown. One side of the rheostat 63 is connected to a conductor 65, and the other to one side of the switch 62. The other side of the switch 62 and also the movable blade of switch 64 are connected to a conductor 66. One contact of the switch 64 is connected to a conductor 67, and the other contact is connected to a conductor 68. The conductors 65, 66, 67 and 68 may be in the form of a cable of any desired length so that the radio receiver may be controlled from any distance. Thus, the remote control elements described may be located on the dashboard or on the steering column of the steering wheel of an automobile, and the remainder of the receiver may be located in the rear end of the automobile, for example in the rear baggage compartment, away from the source of electrical disturbance created by the generator and ignition system of the engine.

The conductor 65 is connected through a resistance 69 to the cathode of a gas type control tube 70. The conductor 66 is connected to one side of the solenoid 51, the other side of the solenoid being grounded. The conductor 67 is connected to one of the contacts of the limit switch 61 and to one winding 71 of the motor 31. The conductor 68 is connected to the other contact of the limit switch 61 and also to the other winding 72 of the reversible motor 31. The other sides of both windings are connected to the armature 73 of the motor through one of its brushes, the other side of the armature being connected through the other brush to the battery 21.

The movable blade common to switches 46 and 47 and the movable blade of switch 48 are grounded. The fixed blade of switch 47 is connected through condenser 74 to the automatic volume control lead 75. Condenser 74 is placed in circuit during reception to increase the time delay applied to the automatic gain control voltage to a value required for proper quality during audible reception of a signal and it is cut out of the circuit to make the automatic gain control voltage "fast acting" during the tuning operation. When condenser 74 is cut out of circuit, condenser 74A remains connected to the automatic volume control voltage lead 75 for the purpose of minimizing feed back from the plate of tube 12 to the grids of tubes 11 and 12 through the lead, which is common to both tubes. However, the automatic gain control is "fast acting" even with the slight delay of condenser 74A. The fixed blade of switch 48 is connected to the control grids of power tubes 17 and it will be readily understood that when these control grids are grounded by closure of switch 48, the receiver is muted.

The plate of the tube 13 is connected to one terminal of the primary 76 of a closely coupled transformer 77, the other terminal of which is connected to the B supply lead 28. The secondary 76' of this transformer is connected to the plates of the detector diode 15, and also to the volume control resistor 58 and the AVC control lead 75.

As also explained and claimed in my copending application, the primary 76 forms part of a tank circuit which includes condenser 78, condenser 79, resistance 80, and an adjustable condenser 81, whereby this tank circuit may be tuned to intermediate frequency. The condenser 79 also forms part of a tank circuit which includes the condenser 79, an inductance coil 81', and an adjustable condenser 82, whereby this circuit is tuned to intermediate frequency. The common side of the three condensers 78, 79 and 82 is grounded. The common side of the primary winding 76 and condenser 81 is connected through a condenser 83 to the common side of the inductance 81' and condenser 82 and to a condenser 84. The condenser 84 is connected to the control grid 86 of the pentode section of tube 87, which also includes diode section 88. The control grid is also connected through a resistance 89 to an intermediate point of a resistance 90. One side of the resistance 90 is grounded, the other being connected to the cathode of the pentode section of tube 87. This cathode is connected to one side of the condenser 91 by-passing resistance 90 and also to a resistance 92, which is shunted by a very small condenser 93. The faster the speed of operation of the tuning condensers 29, the smaller should be the capacity of condenser 93. Condenser 93 with resistance 92 delays the fall of the negative voltage shown by curve 104 of Fig. 2 without substantially delaying the rise of this voltage. Condenser 93 should be made smaller at higher tuning speeds because too much delay prevents the voltage of curve 104 from falling fast enough toward the bottom of the valley, thus canceling a portion of the positive voltage of curve 102 and resulting in reduced sensitivity. However, condenser 93 should not be too small because the delay on the voltage of curve 104 should be generally similar to the delay on the voltage of curve 102 to insure proper anti-static operation. The resistance 92 and the condenser 93 are connected through a resistance 94 to the grid of the gas tube 70 and also to one terminal of the secondary of a transformer 95, constructed and arranged so that the coupling between the primary and secondary may be varied, the other terminal of which is connected to the plate of the diode elements 88. The screen grid of the pentode section of tube 87 is connected by a conductor 96 to the plate circuit of the tube 11 at a point between the primary of the transformer 97 and the resistance 97', which connects the plate to the B supply line 28.

One side of a condenser 98 is connected to the cathode of the tube 70 and the other side to a resistance 99, which is in turn connected to the B supply line 28. The condenser 98 supplies a large flow of current through the relay 45 when the gas tube 70 is ionized while the resistance 99 limits the steady flow of current through the relay 45.

The cathode of the gas tube 70 is connected through a bleeder resistance 100 to the B supply line 28. The plate of the pentode section of tube 87 is connected through the primary of the transformer 95 to the B supply line 28. The cathode and grid of the gas tube 70 are connected through a condenser 101 which provides, with the resistance 94, a time delay circuit which delays the effect of the ionizing voltage on the grid of the gas tube 70.

The transformer 77, including the primary 76 and secondary 76', condenser 79, resistor 80, condenser 81, inductance 81', and condensers 82 and 83, are preferably located within a shielding housing 106, which is grounded, as shown in Fig. 5.

When the receiver is out of operation, the switches 22 and 59 are in circuit opening positions and relay 45 and solenoid 51 are deenergized. When it is desired to place the receiver in operation, the movable blade of the volume control switch 64 is moved to the left. This completes a circuit from the battery 21 through armature 73, winding 71, conductor 67, the switch 64, conductor 66, solenoid 51, and through ground back to the battery. The energization of the solenoid connects the gears 50 and 52 so that the shaft 55 is driven in the volume increasing direction, closing switches 22 and 59. At the same time, the relay 45 being deenergized, the condensers 29 are driven through the clutch 36—37. After the set is turned on, the switch 64 is released and the motor operates first in one direction and then in the other, as determined by the limit switch 61. In one direction of operation motor winding 71 is energized, and in the other, winding 72 is energized, the windings being alternately connected across the battery through circuits including switch 59, the position limit switch 61 and the grounding switch 46. Upon release of switch 64 the solenoid 51 is deenergized to terminate operation of the volume control.

The backward and forward movement of the condensers continues until the tubes have warmed up and a station is received. When a station is received, automatic volume control voltage is supplied from the diode detector 15 to line 75, from whence it is applied to the grids of the tubes 11, 12 and 13. As a result of the application of this automatic volume control voltage on the grid of the radio frequency tube 11, the plate current of the tube is decreased, and the voltage drop across resistance 97' is decreased. Consequently, a more positive voltage is applied to the screen of the pentode section of tube 87 through conductor 96. The voltage thus applied to the screen has a value which follows approximately the contour of curve 102 in Fig. 2 as the signal being tuned in approaches resonance with the I. F. circuits of the receiver, this voltage rising rapidly as a station is being tuned in and reaching a maximum when a station is exactly tuned in. As a result of the increase of the voltage on the screen grid, the plate current of the pentode section of tube 87 increases, and the potential drop across the resistance 90 increases. Consequently, a corresponding voltage is applied through resistances 92 and 94 upon the grid of the gas tube 70. The voltage thus applied to the grid of the gas tube is depicted by the curve 102 on Fig. 2, which indicates the variation of the voltage with respect to frequency.

The primary 76 of the transformer 77, condenser 81, resistance 80, condenser 79, large bypass condenser 78, and the mutual reactance of the condenser 83 constitute a tank circuit tuned to the intermediate frequency. Condenser 79, inductance 81', condenser 82, together with the mutual reactance of the condenser 83, also constitute a tank circuit tuned to intermediate frequency. This circuit is excited through condenser 79 and also through condenser 83. The coupling of these tank circuits through condenser 79 is inversely proportional to the frequency, while the coupling occurring through coil 81', which is energized by a portion of the primary tank circuit current flowing through condenser 83, is proportional to the frequency. Due to these opposing electrostatic and electromagnetic couplings and the parameters of the elements of the two tank circuits, when a signal of exactly intermediate frequency is received by the primary 76, the potential across the condenser 82 is a minimum. In other words, the effect of the coupling occurring through condenser 83 produces a voltage drop across the inductance 81′ which is equal and opposite to the voltage drop occurring across the condenser 79 at resonance. The value of the resistor 80 is selected so as to bring the voltage across the condenser 79 one hundred and eighty degrees out of phase with the voltage across the coil 81′. Under these conditions, there will be substantially zero voltage across the condenser 82 at resonance. Considered in another light, the electromagnetic and electrostatic couplings are balanced or neutralized, i. e., the inductive or capacitative reactive components are made to balance or neutralize. There remains a resistive component of coupling which can be balanced or neutralized only by a resistive component supplied, in the arrangement described, by the resistor 80. In one aspect the arrangement of the coupled circuits may be considered as a balanced bridge circuit or a circuit providing zero coupling at resonance.

On the other hand, if the signal received by the primary 76 is slightly out of resonance, there is no longer a balance between the opposing couplings; that is, the effect of one coupling is greater than that of the other, and a potential varying with the departure from the resonance frequency exists across the condenser 82. The variation of the voltage across the condenser 82 with frequency is indicated diagrammatically in the curve 103 of Fig. 2. Thus, it will be seen that when a station is accurately tuned in, no signal (or a minimum signal in case the balance between the two tuned circuits is not quite exact) is applied to the control grid 86 of tube 87. When the variable condensers 29 are approaching exact tuning, that is, two or three kilocycles away from exact tuning, a very large alternating current voltage is applied to the grid 86 and a correspondingly large alternating current voltage is induced in the secondary of the transformer 95. This voltage is rectified by the diode section of tube 87 and causes a voltage drop across resistance 92, the plate or negative side of which is connected to the grid of the gas tube through resistance 94 to apply a negative voltage to that grid. The variation of the negative voltage applied to the grid of the gas tube with respect to frequency is shown by the curve 104 of Fig. 2. It will be understood that the curve 104 generally corresponds to the curve 103 after amplification in the pentode section and rectification by the diode section 88 of tube 87. The height or magnitude of the single peaked relative to the double peaked control voltage is controllable by varying the coupling of the transformer 95.

Referring again to Fig. 2, it will be seen that a resultant voltage equal to the algebraic sum of the positive direct current voltage represented by the curve 102 and the negative direct current voltage represented by the curve 104 is applied to the grid of the gas tube 70. The resultant voltage applied to the grid of the gas tube is definitely negative more than one kilocycle on each side of perfect tuning. This resultant voltage is depicted by the curve 105 in Fig. 3. When resonance is more closely approached, the positive voltage shown by curve 102 predominates, and the grid of the gas tube 70 becomes sufficiently positive to overcome the fixed negative bias on the grid of the gas tube resulting from the voltage drop across the resistances 69 and 63. The voltage at which ionization occurs may be some value, such for instance as that indicated by the dotted line 106 in Fig. 3, so that the gas tube is ionized only when the tuning means condensers are in position very closely to tune in a station. The tube 70 ionizes and its plate-cathode resistance drops to a low value. The condenser 98, which accumulates a high charge by reason of its connection to the B supply through the resistor 99 during deionization of the tube 70, now discharges rapidly through the relay 45, and the clutch elements 36 and 37 instantly disengage, thus terminating the drive of the condensers. At the same time, the switch 46 is opened to disconnect the motor from the battery. The steady current flow through the resistor 99 and relay 45 is sufficient to hold the relay closed after the condenser 98 is discharged. As the switch 46 is opened, the switch 48 is also opened. This disconnects the connection between the grids of the tubes 17 and ground which had previously muted the audio frequency output of the set. Thus, the audio output of the set can again be heard from the speaker 19. A further function performed by the relay 45 is to close the switch 47, thus connecting one terminal of the condenser 74, which was previously open circuited, to ground. This renders the condenser 74 effective to increase the time delay applied to the automatic volume control voltage which is required for proper quality during the audible reception of a signal.

When the condenser 74 is not in circuit, as when the tuning operation is being effected, the automatic gain control has a time constant shorter than the time required for the variable tuning means to pass by a radio signal. This insures that the actuating voltage will build up sufficiently fast to effect ionization of the gas tube when the station is tuned in, thus preventing a reduction in sensitivity which would result from a delay long as compared with time of passing through the signal. This is important when the actuating voltage is derived, as here, from the automatic gain control. In between stations the automatic gain control voltage is a minimum and if delayed the automatic gain control voltage would not come up to a maximum until after some delay and until after the station had been tuned in, if the delay was sufficiently long. However, by utilizing the "fast acting" automatic gain control the gain control voltage is built up rapidly, as is the actuating voltage. Consequently, the tuning in of the signal is insured.

The volume may be adjusted at any time by moving the movable blade of the volume control switch 64 to one side or the other. The solenoid 51 is thereby energized, operatively connecting the motor to the shaft 55, and the motor is energized and drives shaft 55 to move the arm 57 in the appropriate direction to increase or decrease the volume.

When it is desired to tune in a different station, the switch 62 is opened manually so that the cathode to ground connection of the plate circuit of the gas tube 70 is broken. The gas tube is thus deionized and the relay 45 is consequently deenergized, and the switch 46 closes so that the motor is put into operation. When the switch 62 is allowed to close again, the gas tube 70 will be re-ionized when a signal of adequate strength is received.

The grid bias of the gas tube 70 may be adjusted at will by means of the rheostat 63 so that the minimum strength of station to which the stop-on-carrier system will respond may be regulated at will.

It may be well briefly to review some of the outstanding advantages of the balanced bridge or zero coupling at resonance circuit for stop-on-carrier tuning. This circuit produces a double peaked selectivity curve, as shown at 104 in Fig. 2, the signal voltage of which drops very sharply in the immediate vicinity of resonance. This very sharp change in signal strength with small frequency variations is not dependent on the rigorous elimination of resistance in the circuit, but is inherent in the circuit arrangement. It provides the extremely sharp selectivity desired by simple and inexpensive means. The phasing or balancing out of the effective resistance in the balanced bridge circuit produces a type of resonance curve in which the sides of the depression between the two peaks are straight and steep, coming practically to a point at the bottom so that voltage varies substantially linearly with respect to frequency. This curve is the selectivity curve of a tuned circuit with practically zero resistance, and it has the characteristic that the voltage falls practically to zero at the resonant frequency. With any appreciable effective resistance in the circuit, the bottom of the depression would depart more from linearity and the voltage would not fall near zero at resonance.

It may also be noted that the signal from the balanced bridge circuit does not itself cause the ionization of the gas tube, but prevents the ionization of this tube by the single-peaked control voltage illustrated by the curve 102 in Fig. 2, except in the immediate vicinity of resonance. As long as the voltage shown by the curve 104 has a certain appreciable value, the voltage shown by the curve 102 cannot effect ionization. Although it is the voltage shown by the curve 102 that causes ionization, still it is the voltage from the balanced bridge circuit shown by the curve 104 which determines when or at what frequency ionization is effected.

It should be noted further that with this arrangement, the gas tube cannot be ionized by a broad signal, but is responsive only to a signal of the required sharpness, such as that from a broadcasting station. A broad signal results in a high value of the voltage represented by the curve 104 wherever the voltage represented by the curve 102 is high. Thus, with a broad signal, the voltage 104 effectively prevents the ionization of the gas tube by the voltage 102. The gas tube will be ionized only when the signal is so sharp that the voltage shown by the curve 104 is low at the same frequency or at the same time that the voltage shown by the curve 102 is high. The ionization of the gas tube is thus not possible by broad electrical disturbances, regardless of their intensity. On the contrary, the gas tube may readily be ionized by a weak signal from a broadcasting station through heavy broad electrical disturbances which cannot ionize the gas tube. However, if the broad electrical disturbances are heavy enough and occur at exactly the same time as the signal from a broadcasting station tending to ionize the gas tube, the broad disturbances may prevent the ionization of the gas tube by the sharp signal. But inasmuch as the common varieties of broad electrical disturbances are extremely brief in duration, the chance of their occurrence at exactly the right instant is small. It has been demonstrated that stop-on-carrier sets of the type shown in this application will consistently tune in weak broadcasting stations through extremely strong and frequent static disturbances.

In another aspect, it may be noted that stoppage of the tuning condensers will not be effected in response to a broad signal. It will, however, be effected by a narrow signal in the presence of a broad signal, if the former is of longer duration so that there is some time at which the control voltage resulting from the broad signal is low and that resulting from the narrow signal is high. Again, stoppage will not be effected in response to a narrow signal in the presence of an uninterrupted broad signal of sufficient amplitude. However, since the peaks of most undesired signals, such as static, are of brief duration, the present arrangement utilizing opposing control voltages provides a very effective means for eliminating the effects of interference.

While it is preferable, in order to minimize stoppage in response to static, that the single peaked control voltage have a lower maximum value than the maxima of the double peaked voltage, and that the depression between the maxima of the latter be narrower, at least at its lower end, with respect to frequency than the upper part of the former, as indicated in Fig. 2, these are not necessary.

In the event the tuning of the receiver is carried out in one direction only, i. e., by varying the frequency in one direction, the voltage represented by only one of the two peaks of the double peaked curve would be effectively utilized as the tuning means would be stopped at the resonant frequency when approaching that frequency.

In Fig. 4 there is illustrated an alternating current superheterodyne receiver embodying my invention in which elements corresponding to elements of Fig. 1 are indicated by like reference characters. The receiver comprises an aerial 10, a radio frequency tube 11, a first detector and oscillator tube 12, intermediate frequency tubes 13 and 13', a tube 14 comprising a diode section 15 and an audio amplifier section 16, an audio amplifier tube 16', and two power amplifier tubes 17 connected in push-pull relation. The output of the power tubes 17 is connected through a transformer 18 to the voice coil 19 of a speaker 20. Energy is supplied by means of a power pack designated generally by the reference numeral 105, receiving current from the continuously energized power leads 107 and supplying B voltage to conductor 108 and screen grid voltage to a conductor 109. The cathode of the tube 13' is maintained at a positive voltage relative to ground by a resistance 110, and a voltage negative relative to ground is supplied to a conductor 111 by means of the resistor 111'.

The power pack comprises a transformer 112 which supplies current of suitable voltage, for example 24 volts, to a sensitivity selector relay 113 and one or other of the windings 71 and 72 of a reversible alternating current capacitor motor 31.

The receiver is tuned by means of the gang of condensers 29 operable by a shaft 30 driven by the motor 31 through pinion 114, gear 115, clutch elements 116, pinion 117, gear 118, pinion 119, and gear 120, the direction of drive depending upon which of the windings 71 or 72 is energized. At each end of the condenser travel, an abutment member 60 carried by the shaft 30 operates limit switch 61 from one position to the other so as automatically to connect the other winding 71 or 72, as the case may be, in circuit and thereby reverse the automatic drive of the condenser shaft. It may here be noted that when the motor is operating automatically to drive the condenser in one direction and in the other, the windings 71 and 72 are connected across the secondary of transformer 112 through a switch 121, resistance 122, fixed contact blade 123, and the movable and grounded switch blade 124 by the limit switch 61, with condenser 124A being alternately connected in series with first one and then the other of the two windings. When the motor windings are energized through the aforementioned resistance 122, the motor is effective to drive only the tuning condensers, provided, of course, that the clutch elements 116 are in engagement. At this time the motor armature 73 is biased to the left, as viewed in Fig. 4, by means of a spring, and keeps out of mesh pinion 125 and gear 126 forming part of the volume control mechanism.

When it is desired to operate the volume control, to be described specifically hereinafter, the full voltage obtainable from transformer 112 is applied to either of the windings 71 or 72 by means of normally open button switches 127 and 128, respectively. When either of the switches 127 or 128 is closed, the energization of the motor windings is thus increased to move the armature 73 to the right, as viewed in Fig. 4, when it starts to rotate against the action of the spring to effect meshing of pinion 125 and gear 126 and rotation of the latter. The gear 126 is connected through pinion 129, gear 130, pinion 131, and gear 132, to a shaft 133 carrying the movable contact 57 of a volume control potentiometer 58.

The motor circuit power control switch 121 and a switch 134 controlling the supply of power to the power pack are also operable by the motor driven shaft 133. These switches, like the switches 22 and 59 of Fig. 1, are open when the shaft 133 is at the zero volume position of the contact 57 of the potentiometer 58. When the switch 127 is closed, the winding 71 is connected directly across the secondary winding of transformer 112 and the motor 31 operates to increase the volume setting of the potentiometer 58 and to close the switches 121 and 134. The switch 134 is in series with the primary of the power transformer 135 of the power pack 106, so that the set is put into operation by closing the switch 127 and holding it until the switches 134 and 121 are moved to circuit closing position. When the switch 128 is closed, the volume setting of the potentiometer 58 is lowered, but the switches 121 and 134 do not open until it is lowered to zero.

One side of the secondary of the transformer 112 is grounded and connected by a conductor 136 to one side of the power and volume control switches 127, 128, a station changer switch 137, and a sensitivity selector switch 138. The other side of the switch 138 is connected by conductor 140 to one side of the sensitivity selector relay 113. The other side of the switch 137 is connected to the conductor 140 through a current limiting impedance 141. The other side of the switch 127 is connected through conductor 142 to winding 71 of the motor 31, and the other side of the switch 128 is connected through a conductor 143 to the winding 72 of the motor 31. Windings 71 and 72 are also connected by conductors 143 and 144 to the two fixed contacts of limit switch 61. The other sides of the windings 71 and 72 are connected through conductor 146 to the ungrounded side of the secondary of the transformer 112, as is the other side of the relay 113.

The switches 127, 128, 137, and 138 are preferably assembled as a remote control unit and connected to the receiver as by a single cable 147 including conductors 136, 140, 142, and 143. This cable may be of any desired length so that the remote control unit may be located at a suitable position for convenient operation by the listener.

When the sensitivity selector switch 138 is closed, the relay 113 is energized by the full voltage of the secondary of the transformer 112, and when switch 137 is closed, the relay is energized by only part of the transformer voltage. This relay comprises an armature normally closing a switch 148 and adapted when the relay 113 is either fully or partly energized to open the switch and deionize the gas tube 70. The relay also comprises switches operable by the armature to select either a high or low sensitivity whereby either both strong and weak or strong stations only may be received. This mechanism includes a ratchet wheel 149 mounted on a rotatable shaft 150 and a cam wheel 151 operable upon alternate actuations of the ratchet wheel to open and close first and second switches constituted, the first by fixed and movable blades 152 and 153 and the second by similar blades 154 and 155. The ratchet wheel is so arranged relative to the relay armature that it is actuated only when the relay winding is fully energized by closure of switch 138.

The gas tube 70 of this embodiment is of the type comprising a shield grid connected to the cathode. Specifically, it is an RCA 2051 tube (as distinguished from the three element type 884.) It is preferable to the three element type because of better operating characteristics, higher control factor, and as it requires a smaller grid voltage charge to effect ionization. The cathode of the gas tube 70 is connected through a resistance 156 and a manually adjustable sensitivity control rheostat 157 to blade 154 and to a resistance 158. The other side of the resistance 158 is connected to the switch blade 155 and to one side of the switch 148. The other side of the switch 148 is grounded and connected to the switch blade 153. A high resistance 159 is connected across the switch 148 to prevent sparking.

The cathode circuit of the tube 70 is thus connected to ground through resistance 156, rheostat 157, resistance 158, and switch 148 when the switches are in the position shown in Fig. 4. Consequently, when the relay 113 is energized either partially or wholly by operation of either of the switches 137 or 138, the plate circuit is broken at the switch 148 and the tube 70 is deionized. If the relay 113 is fully energized by closing the switch 138, the tube is also deionized, but at the same time, switch blade 155 is moved into engagement with blade 154, thus shorting the resistance 158 and increasing the sensitivity of the stop-on-carrier system by decreasing the negative grid bias applied to the grid of the gas tube and permitting the tripping of the tube by a lesser positive voltage.

The plate circuit of the gas tube 70 also includes a relay 160 controlling the clutching of the motor to the tuning condensers and a relay 161 controlling the energization of the motor and performing other functions to be referred to shortly. During the reception of a station, tube 70 is ionized and the relays 160 and 161 are energized and the contacts 123 and 124 are separated. When these contacts are in engagement, the motor circuit is completed through resistance 122 and switch 61 so that the motor drives the gang of condensers from one extreme position to the other and back again, and so forth, until the relays 160 and 161 are energized upon the tuning in of a station. The separation of the contacts 123 and 124 resulting from energization of the relay 161 deenergizes the motor, and at the same time, the energization of the relay 160 separates the clutch elements 116. It may be well at this point to note that the pinion 117 is mounted upon an axially movable shaft having an armature 162 at the end adjacent relay 160. A spring 163 biases the shaft to the right to bring the clutch elements into engagement when the relay is deenergized, although better to illustrate the construction the clutch elements are shown disengaged.

A second sensitivity adjustment is provided by an adjustable rheostat 165 controlling the bias of the radio frequency tube 11. The ungrounded end of the rheostat 165 is connected to a fixed switch blade 166 of relay 161 and to switch blade 152 of the sensivity selector relay 113. When a station is being received, the relay 161 is energized and contact 166 is engaged by contact 167 after the latter has first been engaged and depressed by the grounded switch blade 168. When the gas tube 70 is deionized, and the relay 161 is deenergized, this ground connection is broken. Since the resistance 165 is in the cathode circuit of tube 11 only when a station is being tuned in (and not during reception from a station), the result is decreased sensitivity during tuning and increased sensitivity during reception. While this mode of operation results in the elimination of reception of weak stations, it has the advantage that the stations received are received at a more nearly constant level. If the sensitivity remained low after a station was tuned in, the automatic volume control (to which reference will be had shortly) would have but limited effect and there would be a greater difference in the reception volume of weak and strong stations. This disadvantage is avoided by the present invention.

However, if it is desired to tune in the weaker stations, then resistance 165 is short circuited by closing switch 138 to operate relay 113 to actuate cam wheel 151 to close its associated switches. Not only is resistance 165 then grounded through switch blades 152 and 153, but so is resistance 158, as already described, to increase the sensitivity of the gas tube.

Adjustment of the sensitivity levels may be effected by adjustments of resistors 157 and 165. If desired, the resistor 165 may be used alone and resistors 157 and 158 eliminated.

The receiver is muted during tuning when the relay 161 is deenergized as the grounded blade 168 is in engagement with a switch blade 169 connected to the grid of the amplifier tube 16'. This ground is removed during reception by disengagement of contacts 168 and 179.

Automatic volume control voltage is supplied by the diode section 15 of tube 14 having the resistor 170 in circuit therewith. The voltage drop across this resistor is applied to a conductor 171 connected through a resistance 172 to a conductor 173 from whence it is applied to the grids of the tubes 11 and 12. The automatic volume control voltage is applied also to resistances 174 and 175, the latter of which is grounded. The common ends of the resistances 174 and 175, which together constitute a potentiometer, are connected to the grid of tube 13' and through a condenser 176 to contact 167 of relay 161. The conductor 173 is connected through a condenser 177 to a contact 178 of the same relay. When the tube 70 is deionized and the relay 161 is deenergized, as they are during tuning, contacts 178 and 167 are ungrounded, and consequently the automatic volume control applied to the tubes 11, 12, and 13' is "fast" in its action as condensers 176 and 177 are not in circuit. When, however, a station is received and the relay 161 is energized, the condensers 176 and 177 are grounded and the automatic volume control applied to tubes 11, 12, and 13, becomes "slow" due to the time required for the charging and discharging of the condensers which are then in circuit.

The output of tube 13 is connected to the rectifier section 179 of a tube 180 through a pair of tank circuits constructed and arranged as described in connection with Fig. 1, and the various elements of which are indicated by like reference characters. The condensers 84 and 91 connected to the tank circuit are also connected to the anode of the rectifier section 179 and to the cathode common to the rectifier section and a triode section 181. A resistance 182 is connected between the cathode and the anode of the rectifier so that, when a voltage is applied across the rectifier, a negative voltage appears at the anode end of the resistance. This negative voltage is applied through resistor 183 and a bias battery 184 to the grid of the triode section of the tube, the battery being utilized so that a higher plate voltage may be used. The cathode is connected to the control grid of the gas tube 70 through a resistance 185, the grid end of which is connected to ground by a condenser 186, providing a time delay in the action of the gas tube. The plate of the triode section 181 is connected by a conductor 187 to the plate end of a resistor 188 through which plate voltage is supplied to the first intermediate frequency tube 13'. A resistor 188' connecting the plate end of resistor 188 to ground is supplied to provide proper plate voltage to the triode section 181. The control grid of the gas tube 70 is normally biased negatively with respect to ground by connection to the previously mentioned conductor 111 through a resistance 189, which resistance is thus also effectively in the plate cathode circuit of triode section 181 of tube 180. The gas tube and relay 161 also have in circuit therewith the condenser 98 adapted to discharge through the relay to effect fast operation of the latter, the bleeder resistance 100 to provide grid biasing current flow when the tube is deionized, and the current limiting resistor 99.

The operation of the arrangement of Fig. 4 is as follows:

When the receiver is out of operation, the motor energizing circuit is broken by the switch 121 and the power pack is deenergized by switch 134. The sensitivity selector relay 113 is deenergized and while the switches controlled thereby may be in one of their two positions, it will be assumed they are in the positions indicated in Fig. 4, i. e., switch 148 is closed and switches 152—153 and 154—155 open, thereby conditioning the receiver for reception at low sensitivity. The relay 161 is deenergized so that (1) switch blades 166 and 167 are out of engagement so that the receiver is conditioned for low sensitivity reception because resistance 165 is in circuit more negatively to bias the grid of tube 11; (2) switch blades 168 and 169 are in engagement to ground the grid of amplifier tube 16' and thereby mute the receiver; (3) switch blades 123 and 124 are in engagement to condition the motor 31 for operation after opening of push button switch 127, which is closed to start operation of the receiver; and (4) switch blades 167 and 178 are in circuit opening position to disconnect condensers 176 and 177 from ground, thereby to provide the "fast" AVC. The clutch control relay 160 is also deenergized so that the condensers are operatively connected to the motor shaft by the clutch elements 116.

To place the receiver in operation, volume increasing switch 127 is closed for a length of time sufficient for the motor 31 to close switches 121 and 134. Closure of switch 127 results in the application of full voltage to motor winding 71, and the motor armature 73 is displaced to the right to effect meshing of pinion 125 and gear 126 and consequent rotation of shaft 133 in volume increasing direction to close switches 121 and 134. The motor is effective also to drive the condensers as relay 160 is deenergized.

When the switch 127 is opened, the motor continutes to rotate first in one direction and then the other to drive the tuning condensers under the control of limit switch 61, the motor remaining energized through a circuit including the limit switch, switch 121, resistance 122, and the closed switch blades 123 and 124 of relay 161 until the tubes have been heated and a station received. When switch 127 is opened and resistance 122 placed in the motor circuit, the energization of winding 71 (or of winding 72, depending upon which is in circuit at any particular time) is decreased so that the volume control shaft 133 is no longer driven as pinion 125 and gear 126 are moved out of mesh by action of the spring on the motor armature.

After the tubes have been heated, but prior to the reception of a carrier signal from a broadcast station, the plate current of tube 13' is high because no AVC voltage is applied to its grid. Consequently, the voltage drop across resistance 188, which is in the plate circuit of the tube, is also high. This high voltage drop results in the application of a relatively low voltage to the plate of the triode section of tube 180, which, it may be remembered, is supplied through conductor 187, connected to the plate side of resistance 188. Upon reception of a carrier signal the voltage applied to the plate of the triode section of tube 180 is substantially increased, and in a positive direction, because of the application of the AVC voltage (which is "fast" at this time, as explained above) to the grid of tube 13' and tubes preceding it.

The positive voltage thus applied to the plate of the triode section 181 of tube 180 as a broadcast station is tuned in has a value which follows approximately the contour of curve 102 in Fig. 2. It is to be noted, therefore, that resistance 188 corresponds to and performs substantially the same function as resistance 97' of the embodiment of Fig. 1.

While the plate voltage of the triode section of tube 180 varies, as just described, with the tuning in of a station, the grid voltage of the same section is also varied in a manner now to be described. As a station is being tuned in, the tank circuits produce a voltage across condenser 82 that varies with frequency as indicated diagrammatically in the curve 103 of Fig. 2. This voltage is rectified by diode section 179 of tube 180 and is applied as a negative voltage to the grid of the triode section 181, by reason of the grid being connected to the plate side of the resistor 182 of the rectifier circuit. Because of amplification in the triode section, this negative voltage has an effect on the plate current of tube 187 corresponding generally to that shown by curve 104 of Fig. 2.

The plate current of tube 180 thus varies with frequency, as a station is being tuned in, in a manner generally indicated by the curve 105 of Fig. 3, this curve indicating, as already described, the algebraic sum of the curves 102 and 104 of Fig. 2, and the resultant voltage applied to the grid of the gas tube 70. The plate current of tube 180 flows through resistance 189 connected between the cathode of the tube and ground. The voltage drop across this resistance is applied to the grid of the gas tube 70, and since the grid is connected to the cathode end of the resistance, the greater the current flow, the more positive will be the grid of the gas tube. The effective voltage thus applied to the grid as a result of the opposing positive and negative control voltages applied to the plate and grid of the triode section of tube 180, is indicated by curve 105 of Fig. 5. Consequently, when the tuning condensers are in a position very closely to tune in a station, the positive voltage exceeds the normal negative bias applied to the grid of the gas tube and the tube is ionized.

The ionization of the gas tube upon the tuning in of a station results in the energization of relays 160 and 161 and the former at a fast rate because of the discharge of condenser 98 therethrough. The relay 160 declutches the condensers from the motor, thus preventing further driving of them by the inertia of the motor and associated parts, the relay 160 thus determining the rapidity of stoppage.

The energization of relay 161 results in (1) deenergization of the motor by disengagement of contacts 123 and 124; (2) the change of the "fast" AVC to a "slow" AVC by grounding condensers 176 and 177, which results from engagement of switch blades 167 and 168, and of blades 124 and 178, respectively; (3) rendering the amplifier 16' effective by ungrounding its grid, which results from the disengagement of blades 168 and 169; and (4) increasing the sensitivity of the receiver by shunting out resistance 165, which results from engagement of switch blades 166, 167 and 168.

When it is desired to tune in another station, push button switch 137 is closed momentarily if it is desired to tune in the next station on the dial, or for a longer time if it is desired to tune in some other station. Closure of switch 137 results in the energization of relay 113 through current limiting impedance 141 so that the relay is energized sufficiently to open switch 148 but not to operate ratchet wheel 149. Opening of switch 148 opens the plate-cathode circuit of the gas tube 70 with the result it is deionized and relays 160 and 161 are deenergized. The motor 31 is thereupon energized and rotates the tuning condensers until another station is tuned in, in the manner described above.

The volume may be regulated at will during reception by closing switch 127 to increase and switch 128 to decrease the volume. These switches connect windings 71 and 72, respectively, directly across the secondary of transformer 112 so that the motor drives volume control shaft 133 to increase or decrease the volume, as heretofore described, without changing the tuning.

In case it is desired to select high sensitivity, push button switch 138 is closed. This connects relay winding 113 directly across the secondary of transformer 112 and it is energized sufficiently not only to open switch 148, and thereby condition the system for reception of another station, but also to operate ratchet wheel 149. This wheel rotates cam 151 from its indicated position to a position to close switches 152—153 and 154—155. The former shorts out resistance 165 to increase the sensitivity of tube 11, in the same manner as it is increased upon energization of relay 161, and the latter shorts out resistance 158 to increase the sensitivity of gas tube 70. The result is reception at increased sensitivity at all times so that both weak and strong stations may be received. As previously indicated, the high and low selectivity may be controlled by adjusting the effective values of resistances 157 and 165 controlling the grid bias of tubes 70 and 11.

When it is desired to change from high to low selectivity, push button switch 138 is again closed to energize relay 113 sufficiently to open switch 148 and operate ratchet wheel 149, after which a strong station will be tuned in, as already described.

To render the receiver inoperative, push button switch 128 is held closed so that the motor is operated in volume decreasing direction until power switches 121 and 134 are opened.

In the above described embodiment the proper height of the opposing control voltages is obtained by varying the values of the resistances 174 and 175, which control the effective AVC voltage applied to the grid of tube 13′ and thereby the value of the single peaked control voltage. This is preferably done after adjusting the gain of the triode section 181 of tube 180 to secure a suitable value of the double peaked control voltage. The above adjustment of the value of the single peaked voltage is made possible without sacrifice of the effectiveness of the AVC by utilizing, in effect, one AVC for tubes 11, 12, and 13, and another for tube 13′, the source of the single peak control voltage.

The curve 102 should be high enough to cause the ionization of the tube 70 by the weakest stations desired, bearing in mind that the valley between the two peaks of the curve 104 does not fall approximately to zero except on an unmodulated signal. The height of the curve 102 should be kept sufficiently below the curve 104 so that the stop-on-carrier action is sufficiently sharp and so that broad signals, such as static, do not ionize the gas tube 70.

In Fig. 5 there is illustrated another embodiment of my invention having a different arrangement of tubes but utilizing the balanced bridge circuit of the embodiments of Figs. 1 and 4, which, however, is illustrated physically rather than diagrammatically as in Fig. 1. The elements of the balanced bridge circuit are mounted within a shielding container 106. The mounting means consists mainly of a grounded metallic supporting plate 200 to the under side of which is secured a generally H-shaped bracket 201 of insulating material, and on the upper side of which there is mounted an insulating plate 202. The adjustable condensers 81 and 82 are secured to the insulating plate 202 and the windings 76 and 76′ are mounted between the plate 200 and the transverse leg of bracket 201. The inductance coil 81′ is mounted on a support adjustable by a screw 203 and extending between the lower ends of the upright legs of the bracket 201. Condensers 79 and 83 and resistance 80 are supported within the container by the conductors associated therewith.

In the embodiment of Fig. 5 a control voltage from the balanced bridge circuit is applied directly to the control grid 204 of a pentode tube 205, as is a second control voltage obtained from the AVC voltage. The voltage from the balanced bridge circuit is applied through a conductor 206 and the condenser 84 while that obtained from the AVC is applied through conductor 207 and an isolating resistance 208. Only a portion of the AVC voltage is utiliized as conductor 207 is connected between a pair of resistances 209 and 210 connected in series across the source of the AVC voltage. The resistances are shunted by condenser 211 and resistance 210 is also shunted by condenser 212.

The control voltage obtained from the balanced bridge circuit is, of course, alternating, but it is rectified by biasing tube 205 so that it operates near cut-off. Proper bias of the grid 204 of this tube is effected by a bias resistance 213 connected between the cathode of the tube and ground. The bias is normally maintained by reason of the connection of the cathode end of resistance 213 to the "B" supply lead 28 through a bleeder resistance 214 and current limiting resistances 215 and 216.

The plate circuit of tube 205 includes a resistance 217 connected at one end to the plate and at the other to the junction of resistances 215 and 216. The voltage drop across this resistance is utilized to control the ionization of the gas tube 70, the grid of which is connected to the plate end of the resistance by a conductor 218 and a time delay circuit including the resistance 94 and condenser 101.

The resultant control voltage applied to the grid of gas tube 70 is indicated by curve 105 of Fig. 3, which, it may be recalled, is the resultant of curves 102 and 104 of Fig. 3. The control voltage represented by the single peaked curve 102 is the voltage at the plate end of resistance 217 resulting from the application of a portion of the AVC to the grid of tube 205 through conductor 207. While the AVC is a voltage that becomes more negative as resonance is approached, the effect on the control voltage applied to the grid of gas tube 70 is to make it more positive. This results from the decrease in the plate current of tube 205 as a more negative voltage is applied to the grid. The decrease in plate current decreases the voltage drop across resistance 217, so that the grid of tube 70 is made more positive.

The control voltage represented by the double peaked curve 104 is voltage at the plate end of resistance 217 resulting from the application of the output of the balanced bridge circuit to the grid of tube 205. When a station is being tuned in, the output rises gradually to a maximum and then falls sharply to a minimum at resonance frequency, which may be zero if the circuit is properly balanced. Since tube 205 is biased to near cut-off, it acts as a rectifier and the plate current of the tube rises gradually to a maximum and then falls sharply to a minimum. This variation in plate current, which flows through resistance 217, causes the plate end of the latter and the grid of gas tube 70 to be more negative and then sharply less negative as a station is tuned in, the grid potential being represented, as already indicated, by curve 104.

In this embodiment, the height of the single peaked relative to the double peaked curve is adjusted by properly proportioning resistances 209 and 210. This relation is maintained irrespective of whether the station be strong or weak, as both the single and double peaked control voltages are amplified about the same degree in tube 205. The separation of weak from strong stations by the sensitivity control is, therefore, made more effectively.

The operation of the embodiment of Fig. 5 when a station is being tuned in is substantially the same as that of Fig. 1, so that it is not deemed necessary to repeat it at this point.

Another balanced bridge circuit embodying the principles of the present invention is illustrated in Fig. 6. This circuit may be used with the particular circuit arrangements of any of Figs. 1, 4, and 5 by substituting the elements enclosed in dotted lines for similarly enclosed elements in the latter figures. The primary 76 and secondary 76' of transformer 77 are connected to the circuit as previously described. A first tank circuit, tuned to intermediate frequency, is constituted by the primary winding, an adjustable condenser 220, an inductance comprising two parts 222 and 223, condenser 224, and the condenser 78. Portion 222 is made of comparatively few turns that are adjustable to vary the mutual inductance therebetween and an inductance 226 forming part of the second tank circuit. This construction provides, in effect, a vernier adjustment for the mutual inductance. A second tank circuit, also tuned to intermediate frequency, is constituted by the condenser 224, the inductance 226 coupled to inductance 222—223, and an adjustable condenser 228. The junction of condensers 224 and 228 is grounded and the junction of inductance 226 and condenser 228 is connected to the tube to be supplied with the output from the balanced bridge circuit through the condenser 84.

The two tank circuits are coupled inductively by reason of the coupling between the inductances 222—223 and 226 and capacitatively through condenser 224. The mutual inductive reactance of inductances 222—223 and 226 and the capacitative reactance of condenser 224 are so adjusted that they are equal at intermediate frequency and the voltages across inductance 226 and condenser 224 are brought into exact phase opposition by a resistance 230 and a very small adjustable condenser 232 connected across condenser 220 and inductance 222—223. Considered in another light, the electromagnetic and electrostatic couplings are balanced or neutralized, i. e., the inductive and capacitative reactive components are made to balance or neutralize. There remains, however, a resistive component of coupling which can be balanced or neutralized only by a resistive component supplied, in the arrangement of Fig. 6, by the resistor 230.

The arrangement, like that of the previously described circuit, is such that at intermediate frequency the voltage across condenser 224 is equal to and opposite the voltage across inductance 226. In other words, there is zero effective coupling between the two circuits and zero voltage across the condenser 228.

It may be well at this point to describe briefly how the balanced bridge circuits are adjusted. In the circuit of Figs. 1, 4, and 5, the condensers 81 and 82 of the two tank circuits are first adjusted to tune these circuits to intermediate frequency. The mutual inductance between the primary coil 76 and the secondary coil 81' is then adjusted by means of the screw 203 shown in Fig. 5 to bring the steep depression or valley between the two peaks close to a minimum voltage, which should be close to zero on an unmodulated signal at intermediate frequency. Condensers 81 and 82 may then be readjusted to insure that both tank circuits are tuned to the intermediate frequency. The mutual inductance may then again be adjusted, as described above, to bring the two peaks of the curve 104 in Fig. 2 to approximately the same height on each side of the intermediate frequency. The resistance 80 should be maintained with close enough tolerance to insure the reduction of voltage across the condenser 82 to near zero at resonance. If the values of the circuits are correct, the adjusting screw should be adjusted for zero coupling between coil 76 and coil 81'. However, if the circuit constants are slightly incorrect, a limited amount of compensation may be obtained by means of the adjusting screw 203.

The approximate values of the circuit constants for the circuit of Figs. 1, 4, and 5, and for an intermediate frequency of 460 kc. are as follows:

| | | |
|---|---|---|
| Condenser **81** | mmf | 200 |
| Condenser **82** | mmf | 78 |
| Condenser **83** | mmf | 22 |
| Inductance **81'** | mh | 1.2 |
| Inductance **76** | mh | .7 |
| Condenser **78** | mf | .1 |
| Condenser **79** | mmf | 700 |
| Inductance **76'** | mh | .22 |
| Resistance **80** | ohms | 17 |

It should be understood that the capacities of the condensers will vary somewhat with the distributed capacities of the inductances and that the resistance of resistor 80 will vary considerably with the Q of the circuits, i. e., with the resistances of the other elements of the circuits.

The balanced bridge circuit of Fig. 6 is adjusted by first adjusting condensers 220 and 228 to tune the two tank circuits to intermediate frequency. The mutual coupling between the vernier inductance 222 and the inductance 226 is then adjusted to bring the two peaks on either side of the intermediate frequency to approximately the same height. The condenser 232 is then adjusted for correct phasing, which, when attained, will bring the bottom of the steep depression between the two peaks close to zero voltage. The above described adjustments are all relatively independent of one another, the capacity of condenser 232 being so small as to have a negligible effect on the tuning of the tank circuit.

The approximate values of the circuit constants for the circuit of Fig. 6, for an intermediate frequency of 460 kc., are as follows:

| | | |
|---|---|---|
| Condenser **220** | mmf | 180 |
| Condenser **228** | mmf | 224 |
| Inductance **76** | mh | .7 |
| Inductance **76'** | mh | .35 |
| Condenser **224** | mmf | 720 |
| Condenser **78** | mf | .1 |
| Inductance **222—223** | mh | .123 |
| Inductance **226** | mh | .7 |
| Mutual inductance **222—223, 226** | mh | .156 |
| Resistance **230** | ohms | 250,000 |

The balanced bridge circuits described above, while of proven merit, are intended merely to be illustrative of the principles of the invention and they may be modified by those skilled in the art to meet the exigencies of the particular installation or use. The primary principle embodied in the circuits is the obtaining of a reduced output voltage at a desired frequency which can be reduced substantially to zero by coupled circuits characterized by capacitative and inductive reactances brought into proper phase opposition, and furthermore where the output voltage is sharply decreased at the desired frequency. While proper phase opposition has been described as being obtained by adding resistance to the circuit or a resistance and a capacity controlling the effective value of the resistance, it is possible to obtain the phase opposition by utilizing a reactance element having a resistance component. Other modifications of the invention may be made without departing from the principles set forth herein.

What I claim as new, and desire to secure by Letters Patent of the United States, is:

1. In combination, a source of alternating current voltage, means including tuned means energized by said voltage for supplying a first control voltage which is a maximum at a predetermined frequency, means including tuned means energized by said voltage for supplying a second control voltage opposing the first and which is a maximum at a frequency slightly displaced from said predetermined frequency and which drops sharply to a minimum at said frequency, an electron tube having an output circuit including a plate and a control grid for changing the current in said output circuit, means responsive to the current in said output circuit, and means supplied with said control voltages for applying control voltages proportional to said first and second control voltages to the control grid and plate, respectively, of said electron tube to change the current in the output circuit thereof.

2. In a radio receiver having variable tuning means, the combination including, power means for driving said tuning means, relay means starting and stopping said power means, manually operable means controlling said relay means for starting said power means to drive said tuning means, means controlling said relay means for automatically stopping the driving of said tuning means when a carrier signal is closely tuned in, and means operable by said relay means for decreasing the sensitivity of said relay controlling means when said tuning means is being driven by said power means.

3. In a radio receiver having variable tuning means, the combination including, means for driving said tuning means, relay means for starting and stopping said driving means, means controlling said relay for automatically stopping said tuning means when a carrier signal is closely tuned in, means operable by said relay means for decreasing the sensitivity of reception of a high frequency section of the receiver during the time said tuning means is driven by said driving means, and means for rendering said last mentioned means ineffective.

4. In a radio receiver having tuning means, an amplifier comprising a tube having a grid, and a source of automatic volume control voltage connected to said grid, the combination including, an electron tube having an output circuit and electrode means for controlling the current in said output circuit, means responsive to the current in said output circuit, means energized by a signal voltage from said amplifier for supplying a restraining control voltage to the electrode means of said electron tube which is a minimum at a predetermined frequency and a maximum at a frequency slightly displaced from said frequency, and means energized by a signal voltage from said amplifier for supplying an actuating control voltage to the electrode means of said electron tube which is a maximum at said frequency, said last mentioned means including a resistor in the plate circuit of said amplifier tube and a connection from the plate end of said resistor to the electrode means of said electron tube.

5. In a radio receiver having tuning means and a source of negative automatic volume control voltage, the combination including, an electron tube having an output circuit and a grid, resistance means in said output circuit, means conductively connected to the plate end of said resistance means for automatically stopping said tuning means when a carrier signal is closely tuned in and the plate end of said resistance means is at a maximum positive value, and a connection from said source of automatic volume control voltage to the grid of said electron tube for causing the current in the output circuit of the latter to have a minimum value when a station is tuned in closely.

6. In a radio receiver having tuning means and a source of automatic volume control voltage, the combination including, an electron tube having a plate and a control electrode, resistance means in the plate circuit of said tube, a source of B voltage connected to said plate through said resistance means, means including a second electron tube having a control electrode connected to the plate end of said resistance means and a connection from said source of automatic volume control voltage to the grid of said first mentioned electron tube causing the current in the plate circuit of the latter to have a minimum value and the potential applied to its control electrode a maximum value for automatically stopping said tuning means when a carrier signal from a station is closely tuned in.

7. In a radio receiver having tuning means and a source of negative automatic volume control voltage, the combination including, an electron tube having an output circuit and a grid biased so as to cause said tube to act as a rectifier, resistance means in said output circuit, means responsive to the current in said output circuit connected to the plate end of said resistance means, and a connection from said source of automatic volume control voltage to the grid of said electron tube for causing the current in the output circuit of the latter to have a minimum value and the plate end of said resistance means to have a maximum, positive, direct current voltage when a station is tuned in closely.

8. In a controllable radio device, an electron tube including two plates and common cathode means in circuit therewith, a resistor connected to said cathode means and in circuit with one of said plates, a condenser shunted across said resistor, a resistor connected to said cathode means and in circuit with the other of said plates, a condenser shunted across said resistor, the time delays of the voltages appearing across said resistors being generally similar, an electron tube having a control grid, and means for applying the voltage developed across said resistors in series to the control grid of said electron tube to control said device.

9. In stop-on-signal radio apparatus, variable tuning means, a plate voltage supply, electron tube means including a grid, two plates, and common cathode means in circuit therewith, resistive means connected to said cathode in circuit with one of said plates, resistive means connected between said cathode means and the plate voltage source, the other side of said plate voltage source being connected with the other of said plates, impedance means connected between said grid and a point intermediate the ends of said second mentioned resistive means, means including an electron tube having a control grid for controlling the variation of said tuning means, and means for applying the voltage developed across said two resistive means in series to the control grid of said electron tube to control said tuning means.

10. In stop-on-signal radio apparatus, a circuit including amplifying means, variable tuning means and amplifying means sensitivity varying means, means for varying said tuning means to tune in a signal, means including a control tube coupled to said circuit and controlled in response to the tuning of said circuit and a relay operable thereby controlling said sensitivity varying means for varying the sensitivity of said amplifying means in response to the tuning of said circuit, and sensitivity varying means for said control tube.

11. In stop-on-signal radio apparatus, a radio frequency circuit including tuning means and amplifying means, a detector coupled to said amplifying means, means coupled to and energized by said detector supplying a negative direct current first control voltage which has a peak value at a predetermined frequency, means including low resistance sharp cutoff filter means coupled to and energized from said amplifying means for providing an alternating current second control voltage opposing the first and which has maxima at frequencies slightly displaced from the first and a minimum at said predetermined frequency, an electron tube having an output circuit, means coupled to said output circuit for controlling said tuning means, and means for controlling the current in said output circuit in response to both said control voltages.

12. In stop-on-signal radio apparatus, a radio frequency circuit including tuning means and amplifying means, a detector coupled to said amplifying means, means coupled to and energized by said detector supplying a negative direct current first control voltage which has a peak value at a predetermined frequency, means including low resistance sharp cutoff filter means coupled to and energized from said amplifying means for providing an alternating current second control voltage opposing the first and which has maxima at frequencies slightly displaced from the first and a minimum at said predetermined frequency, an electron tube having a grid and an output circuit, means including another electron tube coupled to said output circuit for controlling said tuning means, and means supplying said first and second control voltages to said grid for controlling the current in said output circuit in response to both said control voltages.

13. In stop-on-signal radio apparatus, variable tuning means, an electron tube including a grid, a high voltage control electrode, a diode plate, and common cathode means in circuit therewith, an impedance connected to said cathode means and in circuit with said high voltage control electrode, an impedance connected to said cathode means and in circuit with the diode plate, means coupling the grid to the diode plate, two control voltages, means for applying one of said control voltages to the high voltage control electrode, and means for applying the other of said control voltages to the diode plate, an electronic relay device having control grid means, and means for applying the voltage developed across the said high voltage electrode circuit impedance in response to said two control voltages to the control grid means to control said variable tuning means.

14. In stop-on-signal radio apparatus, variable tuning means, an electron tube including a rectifier plate, a control electrode, and common cathode means in circuit therewith, an impedance connected to said cathode means and in circuit with said rectifier plate, an impedance connected to said cathode means and in circuit with said control electrode, two control voltages, means for applying one of said control voltages to said rectifier plate and the other to said control electrode, an electronic relay device having control grid means, and means for applying the voltage developed across said impedances in series to the control grid means of said electronic relay device to control said variable tuning means in response to said two control voltages.

15. In stop-on-signal radio apparatus, variable tuning means; amplifier means coupled thereto, having a plurality of tubes with grids and cathodes; a relay, coupled to said amplifier means, for stopping tuner variation; means for biasing a plurality of said grids more negative relative to their cathodes to reduce the gain of said amplifying means and the strength of the operating signal applied to said relay during tuner variation, thereby to prevent relay operation by relatively weak signals while permitting operation on stronger signals; and a circuit including a contact operated by said relay, to shunt said biasing means and thereby restore the gain of said amplifier means after stoppage of the tuner by operation of the relay.

16. In stop-on-signal radio apparatus having a speaker, variable tuning means; means for varying said tuning means; an amplifier coupled to said tuning means for supplying an amplified signal to the speaker and for tuning control; automatic and manually adjustable gain control means for said amplifier; a relay coupled to said amplifier for stopping the variation of said tuning means in response to a relatively weak signal or only in response to a stronger signal, depending on the setting of said manual gain control means; and a member controlled by operation of said relay to nullify the gain reduction of said manual gain control means, thus permitting full action of said automatic gain control means on the sound output of the speaker.

17. In stop-on-signal radio receiver apparatus, a variable tuner; means operated in response to a signal tuned thereby for stopping tuner variation; means for reducing the sensitivity of at least one stage of said radio receiver, means operated in response to the output signal of at least one said sensitivity reduced stage for preventing operation of said variation stopping means by relatively weak signals tuned in by said tuner, while permitting operation by stronger signals; and means operated by said stopping means to render said sensitivity reducing means ineffective after the operation of said stopping means.

18. In stop-on-signal radio apparatus having a speaker, a variable tuner; an amplifier coupled thereto for supplying an amplified signal to the speaker; relay means for stopping tuner variation coupled to said amplifier; manually adjustable means controlling the sensitivity of said amplifier and the strength of the operating signal applied to said relay, to prevent operation of said relay by weaker signals tuned by said tuner, while permitting operation by stronger signals; and a circuit including a switch operated by said relay means to nullify the effect of said adjustable sensitivity control means after the signal has been tuned in.

19. In stop-on-signal radio apparatus, variable tuning means, power means for varying the tuning means, electron tube means including cathode means and at least two anodes, a resistance connected to said cathode means and in circuit with one of said anodes, another resistance connected to said cathode means and in circuit with the other anode, the end of one resistance being connected to the end of the other resistance developing voltage of like polarity, two different control voltages varying in response to variation of said tuning means, means coupling one of said control voltages to one of said anodes and the other control voltage to the other anode, a relay controlling said power means, a relay tube having a control grid, cathode and anode, means coupling said relay to said relay tube anode, means for applying a voltage proportional to the difference between the voltages developed across said two resistances in series between the grid and cathode of said relay tube to control said power means and stop said variable tuning means in response to said two control voltages.

20. In stop-on-signal radio apparatus, variable tuning means, electron tube means including cathode means and at least two anodes, a resistance connected to said cathode means and in circuit with one of said anodes, another resistance connected to said cathode means and in circuit with the other anode, the end of one of said resistances developing a positive voltage being connected to the end of the other resistance developing voltage of like polarity, two different control voltages responsive to variation of said tuning means, means coupling one of said control voltages to one of said anodes and the other control voltage to the other anode, a relay controlling said variable tuning means, a relay tube having a control grid, cathode and anode, means coupling said relay to said relay tube anode, means for applying a voltage proportional to the algebraic sum of the voltages developed across said two resistances in series between the grid and cathode of said relay tube to control said variable tuning means in response to said two control voltages.

WILLIAM J. O'BRIEN.

REFERENCES CITED

The following references are of record in the file of this patent:

UNITED STATES PATENTS

| Number | Name | Date |
|---|---|---|
| 2,063,295 | Braden | Dec. 8, 1936 |
| 2,096,874 | Beers | Oct. 26, 1937 |
| 2,175,017 | Cockrell | Oct. 3, 1939 |
| 2,211,539 | Fitzgerald | Aug. 13, 1940 |
| 2,231,806 | Goldsborough | Feb. 11, 1941 |
| 2,253,307 | Righter | Aug. 19, 1941 |
| 2,262,218 | Andrews | Nov. 11, 1941 |
| 2,404,101 | Schock | July 16, 1946 |
| 2,426,580 | O'Brien | Aug. 26, 1947 |